US009334843B2

(12) United States Patent
Czimmek et al.

(10) Patent No.: US 9,334,843 B2
(45) Date of Patent: May 10, 2016

(54) USING RESISTANCE EQUIVALENT TO ESTIMATE TEMPERATURE OF A FUEL-INJECTOR HEATER

(71) Applicant: Continental Automotive Systems, Inc., Auburn Hills, MI (US)

(72) Inventors: Perry Robert Czimmek, Williamsburg, VA (US); Michael Joseph Hornby, Williamsburg, VA (US); Douglas Edward Cosby, Yorktown, VA (US)

(73) Assignee: Continental Automotive Systems, INC., Auburn Hills, MI (US)

(*) Notice: Subject to any disclaimer, the term of this patent is extended or adjusted under 35 U.S.C. 154(b) by 175 days.

(21) Appl. No.: 14/134,686

(22) Filed: Dec. 19, 2013

(65) Prior Publication Data

US 2014/0182366 A1 Jul. 3, 2014

Related U.S. Application Data

(60) Provisional application No. 61/747,474, filed on Dec. 31, 2012.

(51) Int. Cl.
*G01M 15/04* (2006.01)
*F02M 53/06* (2006.01)

(52) U.S. Cl.
CPC .................................... *F02M 53/06* (2013.01)

(58) Field of Classification Search
CPC ........ G01M 15/04; F02M 53/04; F02M 53/06
USPC ................ 73/114.45, 114.48, 114.49, 114.51
See application file for complete search history.

(56) References Cited

U.S. PATENT DOCUMENTS

| | | | | |
|---|---|---|---|---|
| 5,904,902 | A | 5/1999 | Matuoka et al. | |
| 7,424,885 | B2 * | 9/2008 | Everingham et al. | 123/520 |
| 8,439,018 | B2 * | 5/2013 | Kabasin et al. | 123/549 |
| 2008/0264157 | A1 * | 10/2008 | Degler et al. | 73/114.45 |
| 2011/0270568 | A1 | 11/2011 | Hirai et al. | |
| 2011/0276252 | A1 | 11/2011 | Kabasin et al. | |
| 2013/0226472 | A1 * | 8/2013 | Hoffmann | 702/38 |
| 2013/0253800 | A1 * | 9/2013 | Barbaza | 701/102 |
| 2014/0182272 | A1 * | 7/2014 | Czimmek et al. | 60/274 |
| 2014/0182366 | A1 * | 7/2014 | Czimmek et al. | 73/114.45 |
| 2014/0182563 | A1 * | 7/2014 | Czimmek | 123/557 |
| 2014/0183185 | A1 * | 7/2014 | Czimmek | 219/666 |
| 2014/0197154 | A1 * | 7/2014 | Czimmek | 219/498 |
| 2014/0197854 | A1 * | 7/2014 | Czimmek | 324/713 |
| 2015/0128568 | A1 * | 5/2015 | Barbier et al. | 60/274 |

FOREIGN PATENT DOCUMENTS

| | | | |
|---|---|---|---|
| WO | 2012/089707 | A2 | 7/2012 |
| WO | 2013/060630 | A | 5/2013 |

OTHER PUBLICATIONS

Search Report dated Jul. 29, 2013, from corresponding GB Patent Application No. GB1303320.4.

* cited by examiner

*Primary Examiner* — Eric S McCall

(57) ABSTRACT

A temperature of a heated component is determined for control and monitoring. The heater driver, upon receipt of a turn-on signal, generates a current within a component of a heated fuel injector, wherein the current through the component generates an appropriate loss to generate heat for a variable spray fuel injection system. The heater driver regulates the energy to the heated component based on the electrical resistance of that component as a function of temperature and a predetermined reference value for that temperature.

11 Claims, 1 Drawing Sheet

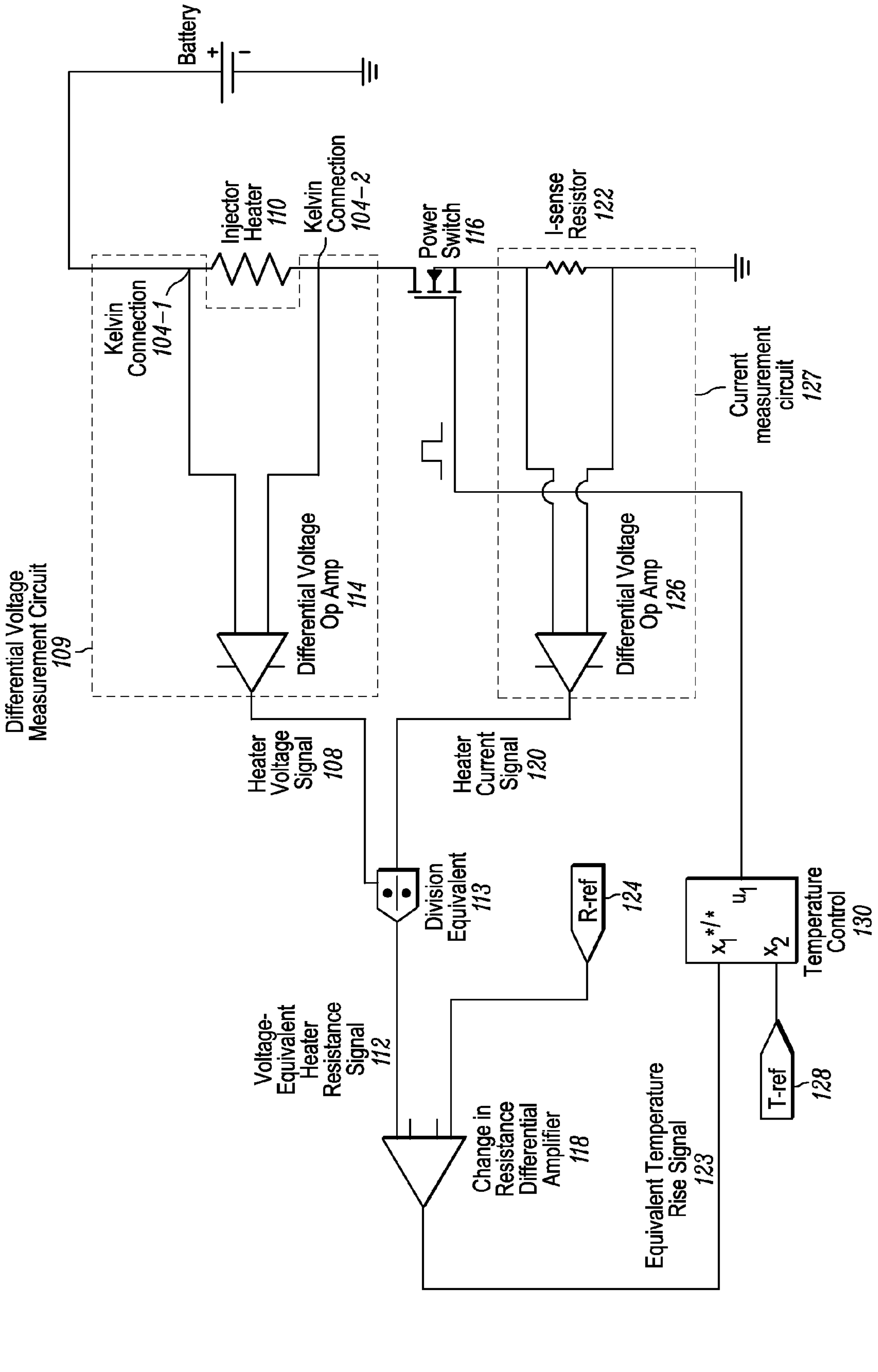
Battery
+
-
Injector Heater 110
Kelvin Connection 104-2
Kelvin Connection 104-1
Power Switch 116
I-sense Resistor 122
Current measurement circuit 127
Differential Voltage Measurement Circuit 109
Differential Voltage Op Amp 114
Differential Voltage Op Amp 126
Heater Voltage Signal 108
Heater Current Signal 120
Division Equivalent 113
R-ref
124
x1 */* u1
x2
Temperature Control 130
T-ref
128
Voltage-Equivalent Heater Resistance Signal 112
Change in Resistance Differential Amplifier 118
Equivalent Temperature Rise Signal 123

USING RESISTANCE EQUIVALENT TO ESTIMATE TEMPERATURE OF A FUEL-INJECTOR HEATER

CROSS-REFERENCE TO RELATED APPLICATIONS

This application is related to the following 5 U.S. provisional patent applications:

Tuned Power Amplifier With Loaded Choke For Inductively Heated Fuel Injector, invented by Perry Czimmek, filed on Dec. 19, 2013, and identified by Application Ser. No. 14/134,774.

Tuned Power Amplifier with Multiple Loaded Chokes for Inductively Heated Fuel Injectors, invented by Perry Czimmek, filed on Dec. 19, 2013, and identified by Application Ser. No. 14/134,834.

Using Resistance Equivalent to Estimate Heater Temperature of an Exhaust Gas After-Treatment Component, invented by Perry Czimmek, Mike Hornby, and Doug Cosby, filed on Dec. 19, 2013, and identified by Application Ser. No. 14/134,931.

Resistance Determination For Temperature Control Of Heated Automotive Components, invented by Perry Czimmek, filed on Dec. 19, 2013, and identified by Application Ser. No. 14/135,021.

Resistance Determination with Increased Sensitivity for Temperature Control of Heated Automotive Component, invented by Perry Czimmek, filed on Dec. 19, 2013, and identified by Application Ser. No. 14/135,089.

BACKGROUND

Embodiments of the invention relate generally to power electronics for injector heaters and more particularly to power electronics for control and monitoring of heater drivers for variable spray fuel injectors.

There is a continued need for improving the emissions quality of internal combustion engines. At the same time, there is pressure to minimize engine crank times and time from key-on to drive-away, while maintaining maximum fuel economy. These pressures apply to engines fueled with alternative fuels, such as ethanol, as well as to those fueled with gasoline.

During cold temperature engine start, the conventional spark ignition internal combustion engine is characterized by high hydrocarbon emissions and poor fuel ignition and combustibility. Unless the engine is already at a high temperature after stop and hot-soak, the crank time may be excessive, or the engine may not start at all. At higher speeds and loads, the operating temperature increases and fuel atomization and mixing improve.

During an actual engine cold start, the enrichment necessary to accomplish the start leaves an off-stoichiometric fueling that materializes as high tail-pipe hydrocarbon emissions. The worst emissions are during the first few minutes of engine operation, after which the catalyst and engine approach operating temperature. Regarding ethanol fueled vehicles, as the ethanol percentage of the fuel increases to 100%, the ability to cold start becomes increasingly diminished, leading some manufacturers to include a dual fuel system in which engine start is fueled with conventional gasoline, and engine running is fueled with the ethanol grade. Such systems are expensive and redundant.

Another solution to cold start emissions and starting difficulty at low temperature is to pre-heat the fuel to a temperature where the fuel vaporizes quickly, or vaporizes immediately ("flash boils"), when released to manifold or atmospheric pressure. Pre-heating the fuel replicates a hot engine as far as fuel state is considered.

A number of pre-heating methods have been proposed, most of which involve preheating in a fuel injector. Fuel injectors are widely used for metering fuel into the intake manifold or cylinders of automotive engines. Fuel injectors typically comprise a housing containing a volume of pressurized fuel, a fuel inlet portion, a nozzle portion containing a needle valve, and an electromechanical actuator such as an electromagnetic solenoid, a piezoelectric actuator, or another mechanism for actuating the needle valve. When the needle valve is actuated, the pressurized fuel sprays out through an orifice in the valve seat and into the engine.

One technique that has been used in preheating fuel is to resistively heat metallic elements of the fuel injector with a time-varying or steady state electrical current. The electrical energy is converted to heat inside a component suitable in geometry and material to be heated by the Joule or Ohm losses that are caused by the flow of current through that component.

The heated fuel injector is useful not only in solving the above-described problems associated with gasoline systems, but is also useful in pre-heating ethanol grade fuels to accomplish successful starting without a redundant gasoline fuel system.

Because the heating technique uses an electrical current, the system includes electronics for providing an appropriate excitation to the component in the fuel injector. This excitation may include controlling the electrical energy and determining when that electrical energy is applied.

Conventional resistive heating is accomplished open-loop, or without control of electrical energy based on a temperature. A remote thermostat or computational model may be incorporated to provide some control to prevent a runaway temperature event and damage to the fuel injector. More sophisticated methods may monitor the current through the heater to estimate the temperature or direct thermocouple, positive/negative temperature coefficient sensor, or other means for determining the temperature for a more precise regulation of injector heater temperature.

The metallic component that is heated will have a positive temperature coefficient of resistance to electrical current (i.e., its electrical resistance will increase as its temperature increases). Ideally, knowing the initial resistance and final resistance would allow the temperature of the component to be known with some degree of precision. The best metals for resistive heaters usually have very small positive temperature coefficients and therefore measurement of the change in resistance by only monitoring current will be desensitized by harness resistance and aging of numerous interconnecting components. Therefore, it becomes difficult to distinguish a change in resistance of the heater component from a change in resistance of other components connected in series.

It would be advantageous to more precisely know the resistance change of the heater component such that control of the temperature may be accomplished.

BRIEF SUMMARY

A temperature of a heated component is determined for control and monitoring. The heater driver, upon receipt of a turn-on signal, generates a current within a component of a heated fuel injector, wherein the current through the component generates an appropriate loss to generate heat for a variable spray fuel injection system. The heater driver regulates the energy to the heated component based on the electrical resistance of that component as a function of temperature and a predetermined reference value for that temperature.

BRIEF DESCRIPTION OF THE DRAWINGS

FIG. 1 depicts a system in accordance with embodiments of the invention.

DETAILED DESCRIPTION

Embodiments of the invention are directed to determining a temperature of a heater component in a heated fuel injector. Current may be measured by precisely measuring a voltage drop across a small value precision resistor inside an electronics assembly, or "current-sense resistor." This voltage drop is directly proportional to the current flowing through the resistor. Knowledge of this current may then be expanded upon by a precise measurement of voltage across the heater component. With the current through the heater known and the voltage across the heater known, from Ohm's Law, the resistance may be calculated in accordance with the well-known formula R=V/I, where R is resistance, V is voltage, and I is current. Embodiments of the invention use this resistance knowledge to estimate a temperature of the heated component and to regulate the temperature of the heated component based on this estimate.

Referring to FIG. 1, an injector heater 110 references the heated component of which a resistance, as a function of temperature, is to be determined. An I-sense resistor differential voltage, also referred to as heater current signal 120, represents the electrical current through the I-sense resistor 122 and, therefore, through the injector heater 110. A current measurement circuit 127 comprises the I-sense resistor 122 and a differential voltage operational amplifier 126. A current sense resistor may be used either on the high side or the low side of the power switch or the load. Current measurement may be done with a hall sensor or with other types of magnetic sensors, such as sense coils.

A differential voltage across the injector heater, also referred to as heater voltage signal 108, represents the excitation voltage directly related to the current flowing through the injector heater. The two differential voltages are solved for Ohm's Law relation, R=V/I, using an analog or digital division equivalent 113, to provide a result as a voltage-equivalent heater resistance signal 112. The analog or digital division equivalent 113 may be implemented in accordance with conventional techniques, which are known in the art, by combining operations and components including, but not limited to: summing and shift registers in digital solutions; and logarithmic, sum or difference, and antilogarithm amplification in analog solutions. The change in resistance differential amplifier 118 then finds a difference between the voltage-equivalent heater resistance signal 112 and a resistance reference value, R-ref 124. This generates a delta, or change in resistance, or error, signal that may be brought in as an equivalent temperature rise signal 123 to a temperature control module 130. This equivalent temperature rise signal 123 may be integrated over time, which may be performed computationally or through an analog conversion to perform the integration function, and may be compared to a temperature reference, T-ref 128. The temperature control module 130 may use this comparison to determine if power should be removed from the injector heater by turning off the power switch 116, represented by a MOSFET in FIG. 1 for this example. The temperature control module 130 may be: a microcontroller, a digital "thermostat", a PID (Proportional Integral Derivative) controller, or any interface that uses the change in temperature (that is represented by the equivalent temperature rise signal) integrated and compared to a target change in temperature, absolute temperature, or some other temperature reference. If the equivalent temperature rise signal 123 is too high, the temperature change is too great, so the power switch 116 may be de-energized thereby turning off the injector heater 110. A cool-down model may then be used to determine when to turn the heater on again. Or if a continuous set point control strategy is used, then the power switch may be turned on and off rapidly (or operated in a linear region like an analog audio amplifier) to regulate the temperature to a target temperature by repeatedly adjusting heater power.

The differential voltage across the injector heater 110 may be obtained by a differential voltage measurement circuit 109, which may comprise a differential voltage operational amplifier 114 and a pair of Kelvin connections 104-1 and 104-2 to the heater as close to the actual heater electrical connections as possible. The pair of Kelvin connections refers to the junction where force and sense connections are made. The force component is a high current carrying conductor and the sense component is a parallel wire for obtaining a voltage potential at that connection. There are two Kelvin connections such that one conductor pair carries the current of the injector heater, and the other conductor pair is used for obtaining the voltage potential. The two pairs of wires may be of different size, with the current carrying pair of an appropriate size to minimize loss, and the voltage potential pair any reasonably small size for the measurement. In this way, these two pairs of wires may be used, in accordance with embodiments of the invention, to perform a four wire measurement.

To measure the differential voltage, the load or heater may be one leg of a Wheatstone bridge that is balanced. And then any change in the load would result in an unbalance of the Wheatstone bridge, and, therefore, a different voltage across the load. Or a resistance divider may be located locally at the heater or load. And then the voltage from the resistance divider may be brought back to the electronics for interpretation.

In sum, in accordance with embodiments of the invention, heater resistance may be determined by dividing differential voltage across the heater, measured close to the heater, by the current through the heater. And the equivalent resistance value may be used to control the heater temperature based on a resistance change due to temperature.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while FIG. 1 depicts a low side semiconductor switch and a low side current sense resistor, other embodiments may use a high side semiconductor switch or high side current sense resistor or any combination thereof as understood by those skilled in the art. It is to be understood that the embodiments shown and described herein are only illustrative of embodiments of the invention and that various modifications may be implemented by those skilled in the art without departing from the scope and spirit of the invention.

The invention claimed is:

1. A method of controlling the temperature of a heater for a fuel injector, the method comprising:

measuring a voltage drop across a fuel-injector heater;

measuring an amount of electrical current passing through the fuel-injector heater;

generating a voltage equivalent heater resistance signal, by determining a division equivalent of, dividing the voltage drop across the fuel-injector heater by the measured amount of electrical current passing through the fuel-injector heater;

generating a temperature rise signal by comparing the voltage equivalent heater resistance signal to a first reference voltage corresponding to a reference resistance value;

generating a temperature control signal by comparing the temperature rise signal to a second reference voltage corresponding to a reference temperature;

providing said temperature control signal to a control device, which is configured to control electrical energy provided to the fuel-injector heater, responsive to a difference between the temperature control signal and the second reference voltage;

wherein control of the fuel-injector heater temperature is determined by current provided to the fuel injector heater, said current being determined from the measurement of electrical current passing through the fuel-injector heater and from the measurement of voltage across said fuel-injector heater, and not from either a measurement or determination of the temperature of either the fuel-injector or the fuel injector heater.

2. The method of claim 1, wherein measuring the voltage drop across the fuel-injector heater further comprises using a Kelvin connection to measure the voltage drop across the fuel-injector heater.

3. The method of claim 1, wherein measuring the amount of electrical current passing through the fuel-injector heater further comprises using a current sense resistor to measure the amount of electrical current passing through the fuel-injector heater.

4. The method of claim 1, wherein the voltage equivalent heater resistance is used as a temperature analog for control of the electrical energy provided to the fuel-injector heater.

5. The method of claim 1, further comprising: comparing the voltage equivalent heater resistance signal to a resistance reference value to generate an equivalent temperature rise signal.

6. The method of claim 5, further comprising:

comparing the equivalent temperature rise signal to a temperature reference voltage to generate a temperature control signal which turns off a semiconductor switch, that is configured to turn off current passing through the fuel-injector heater when the comparison of the equivalent temperature rise signal with the temperature reference value indicates that the fuel-injector heater is hotter than a threshold temperature.

7. Apparatus for controlling the temperature of a heater for a fuel injector, the apparatus comprising:

a differential voltage measurement circuit configured to differentially measure a voltage drop across a fuel-injector heater;

a current measurement circuit configured to measure current passing through the fuel-injector heater;

a division equivalent circuit configured to generate a voltage equivalent heater resistance signal by performing a division equivalent of dividing the measured voltage drop across the fuel-injector heater by the measured current passing through the fuel-injector heater;

a change-in-resistance determining circuit, configured to generate a temperature rise signal by comparing the voltage equivalent heater resistance signal to a first reference voltage corresponding to a reference resistance value;

a temperature control signal circuit, configured to generate a temperature control signal by comparing the temperature rise signal to a second reference voltage corresponding to a reference temperature;

a semiconductor switch, coupled to the temperature control signal circuit and configured to control electrical energy provided to the fuel-injector heater, responsive to the temperature control signal;

wherein control of the fuel-injector heater temperature is effectuated without measurement or determination of a temperature of either the fuel-injector or the fuel injector heater.

8. The apparatus of claim 7, wherein the differential voltage measurement circuit comprises a pair of Kelvin connections.

9. The apparatus of claim 7, wherein current measurement circuit comprises a current sense resistor.

10. The apparatus of claim 7, further comprising a differential amplifier configured to generate an equivalent temperature rise signal by comparing the voltage equivalent resistance signal with a reference resistance value.

11. The apparatus of claim 10, wherein the temperature control signal circuit is configured to compare the equivalent temperature rise signal to a signal representing a temperature reference value to generate a temperature control signal configured to turn off the fuel-injector heater when the comparison of the equivalent temperature rise signal with the temperature reference value indicates that the fuel-injector heater is hotter than a threshold temperature.

* * * * *